(12) United States Patent
Hayashi

(10) Patent No.: US 11,072,229 B2
(45) Date of Patent: Jul. 27, 2021

(54) VEHICLE ELECTRIC DRIVE SYSTEM

(71) Applicant: TOYOTA JIDOSHA KABUSHIKI KAISHA, Toyota (JP)

(72) Inventor: Kenichiro Hayashi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 16/563,082

(22) Filed: Sep. 6, 2019

(65) Prior Publication Data

US 2020/0189375 A1 Jun. 18, 2020

(30) Foreign Application Priority Data

Dec. 12, 2018 (JP) .............................. JP2018-232982

(51) Int. Cl.
| | |
|---|---|
| *B60K 17/16* | (2006.01) |
| *B60K 1/00* | (2006.01) |
| *F16H 37/08* | (2006.01) |
| *F16H 37/06* | (2006.01) |
| *F16H 57/02* | (2012.01) |

(52) U.S. Cl.
CPC .............. *B60K 1/00* (2013.01); *B60K 17/165* (2013.01); *F16H 37/06* (2013.01); *F16H 37/08* (2013.01); *F16H 57/02* (2013.01); *B60K 2001/001* (2013.01); *B60Y 2200/91* (2013.01); *B60Y 2200/92* (2013.01); *B60Y 2400/80* (2013.01); *F16H 2057/02034* (2013.01); *F16H 2057/02086* (2013.01)

(58) Field of Classification Search
CPC .. B60K 1/00; B60K 17/165; B60K 2001/001; B60K 17/16; F16H 57/02; F16H 37/08; F16H 37/06; F16H 2057/02034; F16H 2057/02086; B60Y 2400/80; B60Y 2200/91; B60Y 2200/92; Y02T 10/72
See application file for complete search history.

(56) References Cited

U.S. PATENT DOCUMENTS

| | | | | |
|---|---|---|---|---|
| 3,489,237 | A * | 1/1970 | Loffler .................... | B60K 5/00 180/55 |
| 3,557,634 | A * | 1/1971 | Bixby ................. | B60K 17/346 475/160 |
| 4,435,996 | A * | 3/1984 | Gorby .................... | B60K 17/16 475/247 |
| 5,094,655 | A * | 3/1992 | Sato ....................... | B60K 17/16 384/246 |
| 2004/0149078 | A1* | 8/2004 | Melton .................. | B60B 35/16 74/607 |

(Continued)

FOREIGN PATENT DOCUMENTS

| | | |
|---|---|---|
| JP | 2001-001774 A | 1/2001 |
| JP | 2004-009911 A | 1/2004 |
| JP | 2008-168783 A | 7/2008 |

*Primary Examiner* — Justin Holmes
(74) *Attorney, Agent, or Firm* — Oliff PLC

(57) ABSTRACT

A rotating machine and a pinion shaft are separately arranged on opposite sides to each other in the vehicle front-rear direction across a third axis that is an axis of a differential device in plan view as seen from above the vehicle. This configuration enables the rotating machine, a parallel shaft transmission, the pinion shaft, the differential device, and others to be integrally assembled to a case, to thereby configure an electric drive unit to be compact, which is advantageous in space.

8 Claims, 10 Drawing Sheets

(56) References Cited

U.S. PATENT DOCUMENTS

| | | | |
|---|---|---|---|
| 2008/0176707 A1 | 7/2008 | Yamamoto et al. | |
| 2013/0005526 A1* | 1/2013 | Matsubara | F16H 3/663 475/290 |
| 2014/0262675 A1* | 9/2014 | Sugiyama | F16H 57/0457 192/85.01 |

* cited by examiner

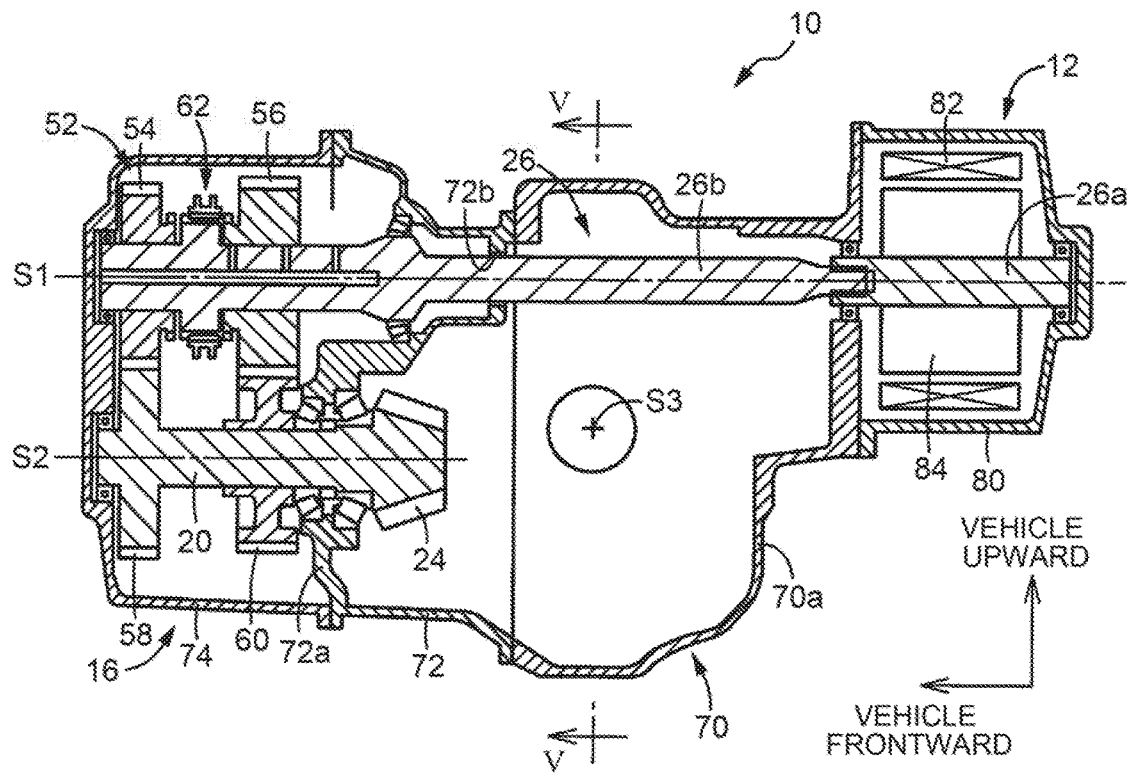

VEHICLE ELECTRIC DRIVE SYSTEM

INCORPORATION BY REFERENCE

The disclosure of Japanese Patent Application No. 2018-232982 filed on Dec. 12, 2018 including the specification, drawings and abstract is incorporated herein by reference in its entirety.

BACKGROUND

1. Technical Field

The present disclosure relates to a vehicle electric drive system, and more particularly to a vehicle electric drive system excellent in mountability to a vehicle.

2. Description of Related Art

A vehicle electric drive system provided with a rotating machine as a driving power source for traveling is known. A vehicle described in Japanese Patent Application Publication No. 2001-1774 (JP 2001-1774 A) is one example of a vehicle of this type, and the vehicle is provided with a pair of rotating machines (electric motors 16) provided coaxially with left and right axle shafts, and the electric motors are butted back to back to be integrally coupled to each other with bolts. Further, Japanese Patent Application Publication No. 2004-9911 (JP 2004-9911 A) proposes a vehicle electric drive system including: (a) a differential device (rear differential 27) that distributes power transmitted from the rotating machine to left and right drive wheels; and (b) a pinion shaft (intermediate shaft 55) provided with a driven gear to which the power output from the rotating machine is transmitted, and a drive pinion that meshes with a ring gear of the differential device.

SUMMARY

However, in the case of the vehicle electric drive system described in JP 2001-1774 A, since a pair of rotating machines coupled and arranged in the vehicle width direction is essential, when large-sized rotating machines are used, the dimension in the vehicle width direction of the system becomes larger and the mountability to the vehicle becomes deteriorated. In the case of JP 2004-9911 A, the rotating machine, the pinion shaft, and the like are arranged at a position more vehicle-frontward than the differential device; therefore, for example, if they are integrally assembled and disposed in a case or the like, the weight of the part located more vehicle-frontward than the differential device becomes heavier, the weight balance is deteriorated, and mountability on the vehicle is not always preferable. That is, if the weight balance is poor, a reinforcing member or the like is required for the purpose of stabilizing the posture during installation to the vehicle.

The present disclosure has been made based on the above-described background, and an object of the present disclosure is to improve mountability such as the weight balance when a vehicle electric drive system is mounted to a vehicle.

In order to achieve the above object, a first disclosure is characterized by including: (a) a rotating machine used as a driving power source for traveling; (b) a differential device that distributes power transmitted from the rotating machine to left and right drive wheels; and (c) a pinion shaft provided with a driven gear to which the power output from the rotating machine is transmitted, and a drive pinion that meshes with a ring gear of the differential device, wherein (d) the rotating machine and the pinion shaft are separately arranged on opposite sides to each other in a vehicle front-rear direction across an axis of the differential device parallel to a vehicle width direction, in plan view as seen from above the vehicle. The axis referred to in the present specification has the same meaning as a center line or a center line of rotation, and an actual axis does not always necessarily exist. As the configuration of separately arranging the rotating machine and the pinion shaft on the opposite sides to each other across the axis of the differential device, any configuration may be adopted as far as respective positions of gravity thereof are located on the opposite sides to each other in the vehicle front-rear direction across the axis of the differential device.

In the vehicle electric drive system of the first disclosure, a second disclosure is characterized in that (a) the rotating machine is disposed in a posture in which an axis of the rotating machine is parallel to the vehicle front-rear direction in plan view, and (b) an output shaft of the rotating machine, in a posture in which the output shaft intersects the axis of the differential device at a right angle in plan view, is disposed at a position upper than the axis in the vehicle height direction.

In the vehicle electric drive system of the second disclosure, a third disclosure is characterized in that (a) the pinion shaft is disposed in a posture in which an axis of the pinion shaft is parallel to the vehicle front-rear direction in plan view, and (b) the differential device includes a differential gear device of a bevel gear type, and the ring gear and the drive pinion include hypoid gears.

In the vehicle electric drive system of the third disclosure, a fourth disclosure is characterized in that (a) the pinion shaft is disposed more vehicle-frontward than the axis of the differential device in plan view, and (b) a meshing position between the ring gear and the drive pinion is set at a position lower than the axis of the differential device in the vehicle height direction.

In the vehicle electric drive system of the third disclosure, a fifth disclosure is characterized in that (a) the pinion shaft is disposed more vehicle-rearward than the axis of the differential device in plan view, and (b) a meshing position between the ring gear and the drive pinion is set at a position upper than the axis of the differential device in the vehicle height direction.

In the vehicle electric drive system of any one of the first to the fifth disclosures, a sixth disclosure is characterized in that (a) a transmission mechanism is provided in a power transmission path between the rotating machine and the pinion shaft, and (b) at least a part of the transmission mechanism is disposed on the same side as the pinion shaft in the vehicle front-rear direction across the axis of the differential device in plan view.

In the vehicle electric drive system of any one of the first to the sixth disclosures, a seventh disclosure is characterized in that (a) the rotating machine and the pinion shaft are arranged in postures in which respective axes of the rotating machine and the pinion shaft are parallel to each other, and (b) a parallel shaft transmission that establishes multiple gear stages with different gear ratios is provided across the output shaft of the rotating machine and the pinion shaft.

In the vehicle electric drive system of any one of the first to the seventh disclosures, an eighth disclosure is characterized in that an axle housing, which rotatably holds left and right axle shafts to which the power distributed by the differential device is transmitted, and which is coupled to left and right suspension devices, is integrally configured using no screw fastening.

In the vehicle electric drive system of the eighth disclosure, a ninth disclosure is characterized in that (a) the rotating machine and the pinion shaft are disposed in postures in which the respective axes of the rotating machine and the pinion shaft are parallel to the vehicle front-rear direction in plan view, (b) the rotating machine is integrally fixed to the axle housing in such a manner that the rotating machine protrudes to one side in the vehicle front-rear direction, a gear case is integrally fixed to the axel housing in such a manner that the gear case protrudes to the other side in the vehicle front-rear direction, and houses and rotatably supports a gear mechanism including the pinion shaft, and the vehicle electric drive system is integrally configured.

In the vehicle electric drive system of any one of the first to the seventh disclosures, a tenth disclosure is characterized in that (a) the rotating machine, the pinion shaft, and the differential device are assembled in a common case, the vehicle electric drive system is integrally configured, and (b) the case is coupled to a member on the vehicle body side at an upper part or a lower part of the case than the axis of the differential device. Note that the ninth disclosure can be deemed as one aspect of the tenth disclosure, and the case is configured to include the axle housing and gear case.

In such a vehicle electric drive system, since the rotating machine and the pinion shaft are separately arranged on the opposite sides to each other in the vehicle front-rear direction across the axis of the differential device in plan view as seen from above the vehicle, the weight balance between the front part and the rear part of the vehicle electric drive system across the axis of the differential device becomes preferable, to thus configure the vehicle electric drive system compact. That is, if the weight balance is poor, it is necessary to increase strength, and rigidity, etc. of each part, which hinders compactness of the system. In addition, as compared to the case where the pair of rotating machines are coupled in the axial direction and arranged in the vehicle width direction, the dimension in the vehicle width direction can be reduced, and mountability in the vehicle is enhanced because of the compact configuration.

In the second disclosure, the rotating machine is disposed in a posture parallel to the vehicle front-rear direction, and in the third disclosure, not only the rotating machine but also the pinion shaft are disposed in postures parallel to the vehicle front-rear direction; thus, it is possible to configure the both dimensions of the rotating machine and the pinion shaft in the vehicle width direction to be further compact.

In the fourth disclosure, the pinion shaft is disposed more vehicle-frontward than the axis of the differential device in plan view, and a meshing position between the ring gear and the drive pinion is set at a position lower than the axis of the differential device. Since this positional relationship is the same as that in a general vehicle of the related art in which power is transmitted to the differential device via a propeller shaft, the existing differential device and drive pinion, etc. can be used as they are or used without requiring a major design change, and the vehicle electric drive system can be configured inexpensively.

In the fifth disclosure, the pinion shaft is disposed more vehicle-rearward than the axis of the differential device in plan view, and a meshing position between the ring gear and the drive pinion is set at a position upper than the axis of the differential device. As compared to the fourth disclosure, the positional relationship between the ring gear and the drive pinion is the same as that in the fourth disclosure except that the ring gear and the drive pinion are rotated 180 degrees about the axis of the differential device. Hence, in this case, the existing differential device and the like can be used as they are or used without requiring a major design change, and the vehicle electric drive system can thus be configured inexpensively.

In the sixth disclosure, a transmission mechanism is provided in a power transmission path between the rotating machine and the pinion shaft. At least a part of the transmission mechanism is disposed on the same side as the pinion shaft in the vehicle front-rear direction across the axis of the differential device; thus, the weight on the pinion shaft side becomes heavier. Accordingly, also in the case in which a large-sized rotating machine with a relatively heavy weight is used, it is possible to preferably maintain the weight balance between the front part and the rear part of the vehicle electric drive system across the axis of the differential device.

In the seventh disclosure, the rotating machine and the pinion shaft are arranged in postures in which the rotating machine and the pinion shaft are parallel to each other, and the parallel shaft transmission is provided across the output shaft of the rotating machine and the pinion shaft. Accordingly, while the vehicle electric drive system is configured to be compact, torque of the rotating machine is switched in multiple gear stages by the parallel shaft transmission in accordance with the traveling load, and the required output, etc., and is transmitted to the pinion shaft, to thereby improve driving performance and drivability of the vehicle. Further, the parallel shaft transmission is disposed on the same side as the pinion shaft, and thus the weight on the pinion shaft side becomes heavier, which provides the same effect as that of the sixth disclosure.

In the eighth disclosure, an axle housing, which rotatably holds the left and right axle shafts, and which is coupled to the left and right suspension devices, is integrally configured using no screw fastening. Hence, the vehicle electric drive system including this axle housing can be configured with a smaller weight and more inexpensively. That is, when a vertical load is applied to the wheel due to unevenness of a road surface or the like, this vertical load is transmitted to the above-configured axle housing, and thus a bending stress or the like is generated between the axle housing and the suspension device. However, presence of a screw fastening part is disadvantageous in strength, so that not only additional parts such as bolts but also a reinforcing structure, etc. are required, resulting in increase in weight and a higher cost.

In the ninth disclosure, the rotating machine is integrally fixed to the axle housing in such a manner as to protrude to one side in the vehicle front-rear direction, the gear case is integrally fixed to the axle housing in such a manner as to house and rotatably support the gear mechanism including the pinion shaft, and protrude to the other side of the vehicle front-rear direction, and the vehicle electric drive system is integrally configured. Accordingly, the vehicle electric drive system can be easily assembled to the vehicle.

In the tenth disclosure, the rotating machine, the pinion shaft, and the differential device are assembled in a common case, and the vehicle electric drive system is integrally configured; thus, it is possible to easily assemble the vehicle electric drive system. In addition, the case is coupled to a member on the vehicle body side at an upper part or a lower part of the case than the axis of the differential device. Accordingly, the weight balance between the front part and the rear part of the vehicle electric drive system across the axis of the differential device becomes preferable due to the separate arrangement of the rotating machine and the pinion shaft. Hence, the supporting structure and others for installing the vehicle electric drive system into the vehicle can be simplified, thus reducing the weight thereof.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a sectional view of the vehicle electric drive system of FIG. 3 in an assembled state vertically cut along the vehicle front-rear direction, and is a sectional view taken along line IV-IV in FIG. 5;

FIG. 5 is a sectional view of the vehicle electric drive system of FIG. 3 in an assembled state vertically cut along a vehicle width direction, and is a sectional view taken along line V-V in FIG. 4;

DETAILED DESCRIPTION OF EMBODIMENTS

Figure 1:
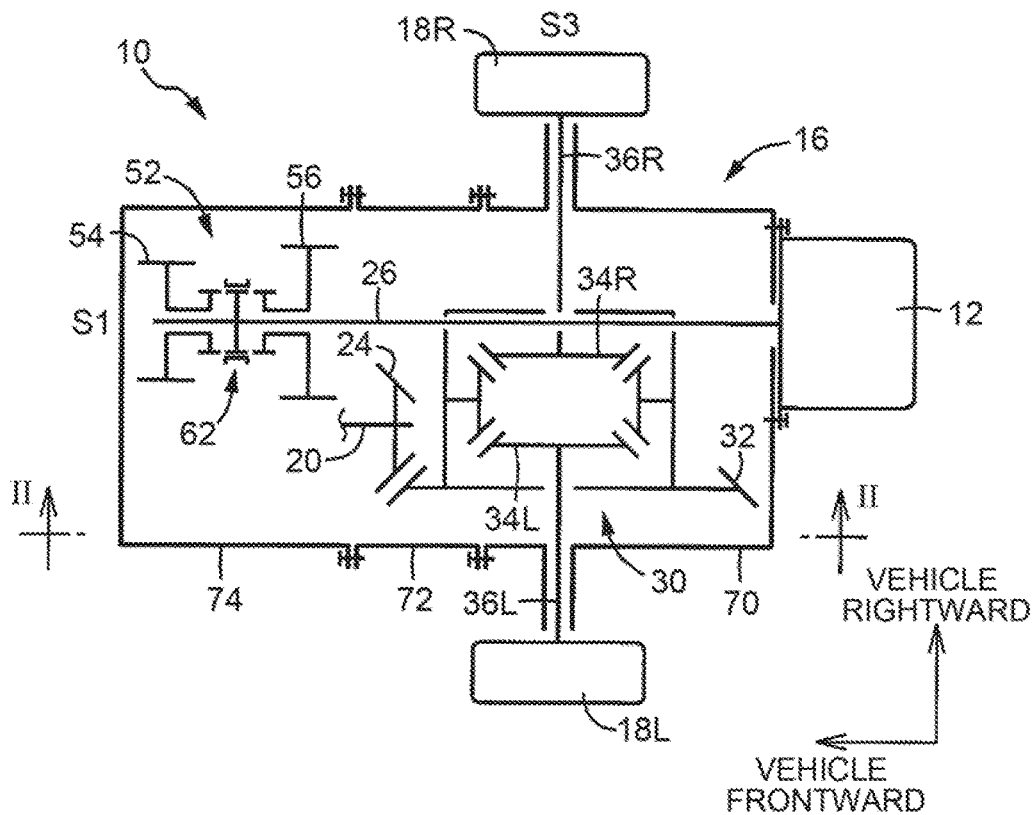
FIG. 1 is a view explaining a schematic configuration of a vehicle electric drive system according to an embodiment of the present disclosure, and is a skeleton view thereof in plan view as seen from above the vehicle.

The present disclosure relates to a vehicle electric drive system having at least a rotating machine functioning as an electric motor so as to be used as a driving power source for traveling, and the present disclosure is suitably applied to an electric vehicle traveling with only a rotating machine. However, for example, the present disclosure can be applied to a series type hybrid vehicle provided with an engine (internal combustion engine) dedicated to electric power generation, a parallel type hybrid vehicle using an engine as a driving power source, and the like. The electric vehicle may be a vehicle driven by using only a vehicle mounted battery as an electric power source, but may be a vehicle including an electric power generation device such as a fuel cell. As a rotating machine used as a driving power source, a motor generator that can be used alternatively as either an electric motor or an electric power generator is desirable.

The present disclosure is suitably applied to a rear wheel drive vehicle of a driving power source rear-mount type or a front wheel drive vehicle of a driving power source front-mount type. In a front and rear wheel drive vehicle, when the front wheel and the rear wheel are driven using different driving power sources, the vehicle electric drive system according to the present disclosure can be used as a driving system for either the front wheel or the rear wheel. That is, the disclosure is suitably applied to a vehicle electric drive system in which a transaxle including a differential device and a rotating machine are assembled in a common case. The present disclosure can be applied not only to passenger cars but also to trucks and the like. As the differential device, a differential gear device of a bevel gear type or a planetary gear type is suitable, and for example, when a pair of clutches capable of controlling a transmission torque to the left drive wheel and the right drive wheel is provided, the pair of clutches can be deemed as the differential device.

A transmission mechanism such as a speed reduction mechanism or a speed increasing mechanism is disposed between an output shaft of the rotating machine and the differential device when necessary. The transmission mechanism may be a mechanism that changes gears at a constant gear ratio, such as a parallel shaft type or a planetary gear type, but may also be a multistage transmission that establishes multiple gear stages with different gear ratios by an engaging device such as a clutch and a brake. Such a transmission mechanism is disposed, for example, on the same side as a pinion shaft in the vehicle front-rear direction across an axis of the differential device in plan view, but may be disposed on the same side as the rotating machine, or may be separately arranged on the both sides, respectively.

The rotating machine and the pinion shaft are separately arranged on opposite sides to each other in the vehicle front-rear direction across the axis of the differential device; however, when a plurality of rotating machines are provided, at least one rotating machine and the pinion shaft may be separately arranged on the opposite sides to each other in the vehicle front-rear direction across the axis of the differential device. The rotating machine and the pinion shaft are arranged, for example, in a posture in which both axes of rotating machine and the pinion shaft are parallel to the vehicle front-rear direction in plan view; however, the axes of the rotating machine and the pinion shaft are not always necessary to be parallel to the vehicle front-rear direction, and these axes may be arranged in a posture in which either one or both of the axes are parallel to the vehicle width direction.

Although it is desirable that the axle housings that hold the left and right axle shafts and are coupled to the left and right suspension devices be integrally configured without using screw fastening, the axle housings can also be configured by a plurality of members screwed by bolts or the like. The axle housing integrally formed without using screw fastenings may be formed by using an integrally-formed cast products or by joining a separate product to this cast product by welding or the like. Each of the suspension devices is configured to include, for example, an air cushion, a coil spring, a suspension arm, and a plate spring, etc., but various devices can be adopted to reduce transmission of an impact load and the like between the wheels and the vehicle body. The axle shaft and the axle housings are not necessarily essential when the present disclosure is implemented, and for example, and various modes may be adopted as follows, for example, that a drive shaft having a constant velocity joint or the like may be disposed to protrude outside from a transaxle case holding the differential device or the like.

It is desirable that the vehicle electric drive system is integrally configured by assembling the rotating machine, the pinion shaft, and the differential device in a common case, and the case is attached to a member on the vehicle body side, such as a suspension device, at an upper part or a lower part of the case than the axis of the differential device; however, the vehicle electric drive system may be divided into a plurality of parts and attached to the vehicle body. In addition, various aspects of the mounting structure relative to the vehicle body may be adopted; for example, if the rotating machine, the pinion shaft, and the differential device are assembled to a common case, the case can be attached to the member on the vehicle body side on both of the vehicle front side and the vehicle rear side across the axis of the differential device.

Hereinafter, embodiments of the present disclosure will be described in detail with reference to the drawings. In the following embodiments, the drawings are appropriately simplified or modified for convenience of explanation, and dimensional ratios and shapes of respective parts are not always accurately illustrated.

Figure 2:
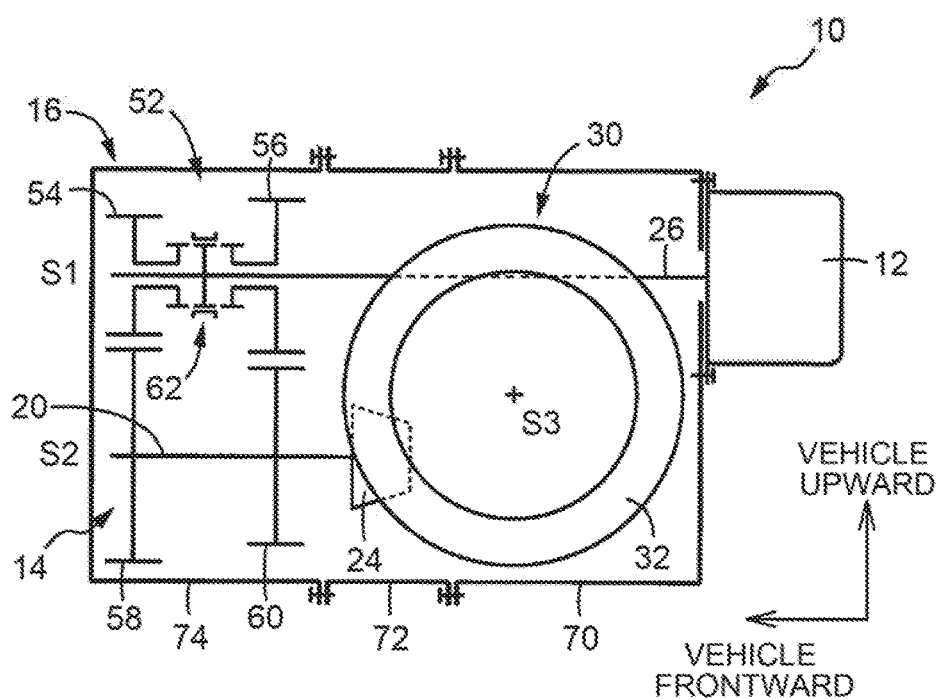
FIG. 2 is a sectional view taken along line II-II in FIG. 1, that is, a skeleton view of the section as seen from the left side of the vehicle.

FIG. 1 is a view for explaining the schematic configuration of an electric drive unit 10 according to one embodiment of the present disclosure, and is a skeleton view thereof in plan view as seen from above of the vehicle; and FIG. 2 is a sectional view taken along line II-II in FIG. 1, that is a skeleton view of a sectional view as seen from the left side of the vehicle. The electric drive unit 10 corresponds to the vehicle electric drive system, and is installed in an electric automobile, such as a truck, and includes: a rotating machine 12 disposed on a first axis S1 parallel to the vehicle front-rear direction and used as a driving power source; a transaxle 14 that is a power transmission mechanism that transmits power of the rotating machine 12 to the left and right rear wheels 18L, 18R that are drive wheels; and a case 16 holding the rotating machine 12 and the transaxle 14. The rotating machine 12 is a so-called motor generator, and functions alternatively as either an electric motor or an electric power generator. The rotating machine 12 is used as a driving power source for traveling, and is also regeneratively controlled during vehicle traveling so as to functions as an electric power generator to generate regenerative braking force. The case 16 includes a plurality of members as needed. The first axis S1 coincides with the axis of the rotating machine 12. The first axis S1 is set, for example, substantially horizontal, but may be inclined in the height direction in the vehicle front-rear direction.

The transaxle 14 includes a pinion shaft 20 disposed on a second axis S2 parallel to the first axis S1, a parallel shaft transmission 52, and a differential device 30. The second axis S2 coincides with the axis of the pinion shaft 20, and is set at a position adjacent to and below the first axis S1 in the vehicle height direction. The second axis S2 can be set immediately below the first axis S1, but in the present embodiment, as is apparent from FIG. 1, the second axis S2 is shifted in the vehicle width direction (to the vehicle left side in FIG. 1). Between the pinion shaft 20 and an output shaft 26 of the rotating machine 12, a two-stage parallel shaft transmission 52 is disposed as a transmission mechanism. The parallel shaft transmission 52 includes: a pair of transmission drive gears 54, 56 rotatably disposed about the first axis S1 so as to be relatively rotatable about the output shaft 26; and a pair of transmission driven gears 58, 60 provided on the pinion shaft 20 so as to mesh with the transmission drive gears 54, 56; and a meshing clutch mechanism 62 with a synchro mechanism that selectively couples the pair of transmission drive gears 54, 56 to the output shaft 26. By coupling the transmission drive gear 54 to the output shaft 26, a low speed gear stage having a large gear ratio (=input rotational speed/output rotational speed) is established; by coupling the transmission drive gear 56 to the output shaft 26, a high speed gear stage having a small gear ratio is established; and by not coupling neither the transmission drive gears 54 nor 56 to the output shaft 26, a neutral to separate the rotating machine 12 from the power transmission path can be established. Note that instead of the meshing clutch mechanism 62, a single-disk type or multi-disk type friction engagement clutch may be used.

The pinion shaft 20 is provided with a drive pinion 24 having a diameter smaller than those of the transmission driven gears 58, 60. The drive pinion 24 is in mesh with a ring gear 32 of the differential device 30, and power transmitted from the rotating machine 12 to the pinion shaft 20 via the parallel shaft transmission 52 is transmitted to the differential device 30 via the drive pinion 24 and the ring gear 32. That is, the electric drive unit 10 of the present embodiment is a propeller-less type drive system having no propeller shaft, which is configured such that rotation having been transmitted from the output shaft 26 of the rotating machine 12 through the parallel shaft transmission 52 to the pinion shaft 20 is directly transmitted to the differential device 30.

The differential device 30 is disposed on a third axis S3 parallel to the vehicle width direction. This differential device 30 is a differential gear device of a bevel gear type, and transmits power having been transmitted to the ring gear 32 from a pair of side gears 34L, 34R via a pair of left and right axle shafts 36L, 36R to the left and right rear wheels 18L, 18R. The third axis S3 coincides with the axes of the differential device 30 and the axle shafts 36L, 36R. The meshing position between the drive pinion 24 and the ring gear 32 is a position below the third axis S3 in the vehicle height direction, and these drive pinion 24 and ring gear 32 are hypoid gears.

The output shaft 26 of the rotating machine 12 is disposed at a position above the differential device 30, and extends in the vehicle front-rear direction so as to intersect the third axis S3 that is the axis of the differential device 30 at a right angle in the plan view shown in FIG. 1. In the plan view of FIG. 1, the rotating machine 12 is disposed more vehicle-rearward than the third axis S3, while the parallel shaft transmission 52 and the pinion shaft 20 are disposed more vehicle-frontward than the third axis S3. The output shaft 26 includes a plurality of members coupled to the output shaft 26 by splines or the like as necessary.

Figure 3:
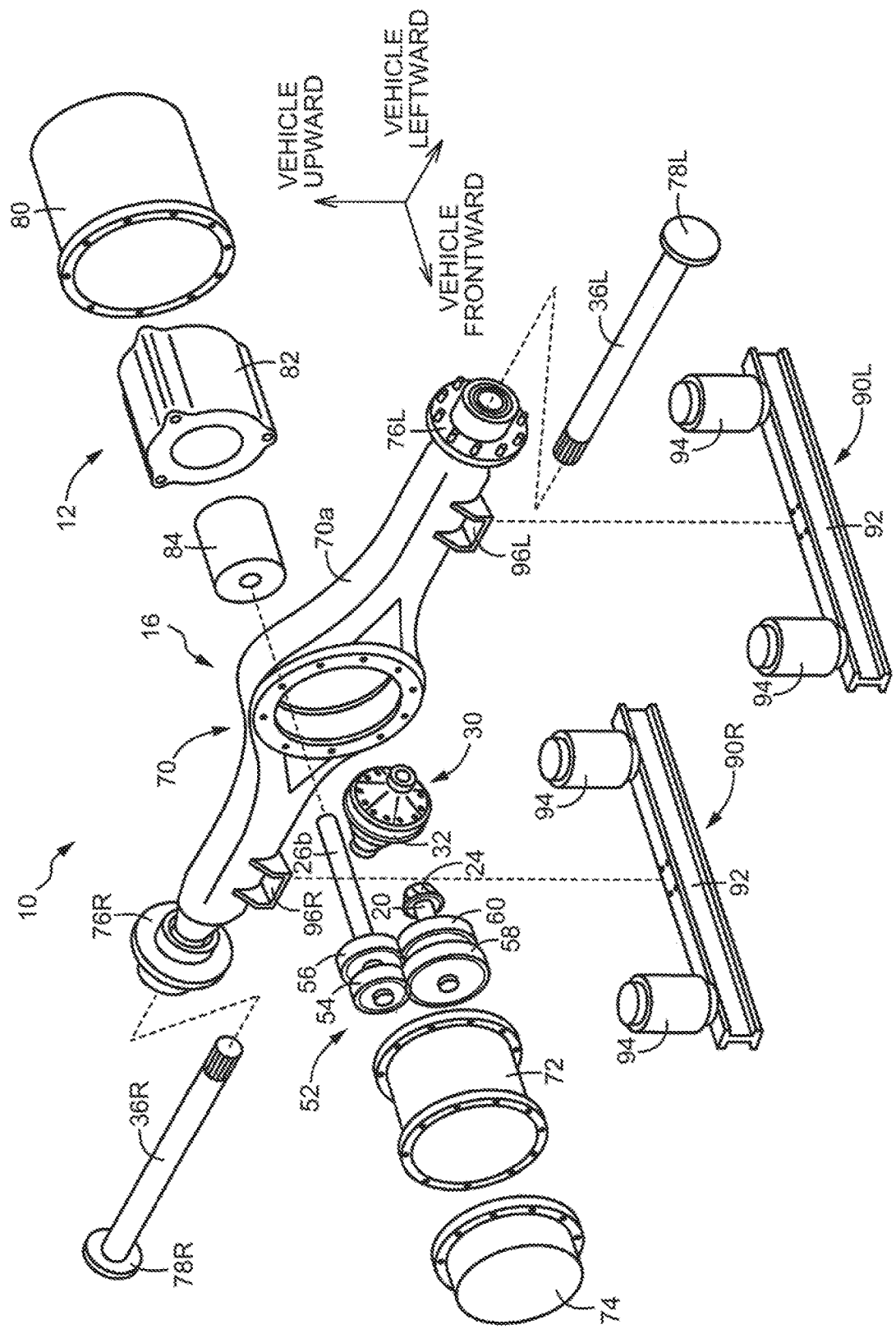
FIG. 3 is a view explaining a specific example of the vehicle electric drive system of FIG. 1, and is a perspective view in which components are disassembled and shown together with a pair of suspension devices.

FIG. 3 is a view explaining a specific example of the electric drive unit 10, and is a perspective view illustrating that the component parts are disassembled and illustrated together with a pair of left and right suspension devices 90L, 90R. FIG. 4 is a sectional view of the electric drive unit 10 of FIG. 3 in an assembled state, vertically cut along the vehicle front-rear direction, and is a sectional view taken along IV-IV line in FIG. 5, that is, a sectional view in the vicinity of the first axis S1 that is the axis of the output shaft 26. FIG. 5 is a sectional view of the electric drive unit 10 of FIG. 3 in an assembled state, vertically cut along the vehicle width direction, and is a sectional view taken along line V-V in FIG. 4, that is, a sectional view in the vicinity of the third axis S3 that is the axis of the differential device 30.

As is apparent from FIGS. 3 to 5, the case 16 mainly includes an axle housing 70 which accommodates the left and right axle shafts 36L, 36R and rotatably holds these axle shafts about the third axis S3. The rotating machine 12 is integrally fixed to the axle housing 70 in such a manner as to protrude rearward in the vehicle front-rear direction. The rotating machine 12 includes a motor case 80, a stator 82, and a rotor 84, and the motor case 80 and the stator 82 are integrally fixed to the axle housing 70 using a plurality of bolts. The output shaft 26 of the rotating machine 12 includes a motor shaft 26a integrally fixed to a rotor 84, and a long rotary shaft 26b coaxially coupled to the motor shaft 26a via a spline or the like so as to transmit power.

The axle housing 70 is also provided with a cylindrical first gear case 72 so as to project frontward in the vehicle front-rear direction, a bottomed cylindrical second gear case 74 to close an opening at the front end of the first gear case 72, and accommodates a gear mechanism including the pinion shaft 20 and the parallel shaft transmission 52 thereinside. The axle housing 70, the first gear case 72, and the second gear case 74 are integrally fixed to one another using a plurality of bolts. The vehicle front part of the output shaft 26 is rotatably held by the first gear case 72 and the second gear case 74 about the first axis S1 via a plurality of bearings, and the pinion shaft 20 is rotatably held about the second axis S2 via a plurality of bearings. In the first gear case 72, a support wall 72a to support the output shaft 26 and the pinion shaft 20 is so provided as to extend toward the inner peripheral side, and the support wall 72a is provided with a insertion hole 72b that allows the output shaft 26 to penetrate through the support wall 72a in the vehicle front-rear direction.

The axle housing 70 includes an axle housing body 70a that is an integrally casted product, a pair of cylindrical sleeves 70bl, 70br integrally welded to respective left and right ends of the axle housing body 70a, and left and right wheel mounting members 76L, 76R are rotatably held about the third axis S3 via bearings around the outer peripheries of the sleeves 70bl and 70br. While, the left and right axle shafts 36L, 36R are inserted into the axle housing 70 from respective openings of the sleeves 70bl, 70br, and are spline-fitted with the side gears 34L, 34R of the differential device 30, disk-like flanges 78L, 78R provided at respective ends projecting from the sleeves 70bl and 70br are integrally fixed to the wheel mounting members 76L, 76R via a plurality of bolts, so that the wheel mounting members 76L, 76R are rotated integrally with the respective axle shafts 36L, 36R. The axle shafts 36L, 36R are rotatably held about the third axis S3 by the axle housing 70 via the wheel mounting members 76L, 76R. The left and right rear wheels 18L, 18R are integrally mounted to the respective wheel mounting members 76L, 76R using a plurality of bolts. The axle housing 70 also rotatably holds the differential case of the differential device 30 about the third axis S3 via a pair of bearings (not shown).

The axle housing body 70a includes a pair of cylindrical portions through which the left and right axle shafts 36L, 36R are respectively inserted, and brackets 96L, 96R coupled to the suspension devices 90L, 90R are integrally fixed to the lower surfaces of the cylindrical portions by welding or the like. The left and right suspension devices 90L, 90R each include a long suspension arm 92 having an I-shaped cross section, and the brackets 96L, 96R are integrally fixed to middle parts of the respective suspension arms 92 by a plurality of bolts. That is, the case 16 is attached to the left and right suspension arms 92 that are members on the vehicle body side, at lower parts of the case than the third axis S3 that is the axis of the differential device 30. Each of the suspension arms 92 is disposed in a posture parallel to the vehicle front-rear direction, and is attached to the vehicle body such as a frame of the vehicle via air cushions 94 at both end parts of the suspension arm 92 in the longitudinal direction (vehicle front-rear direction). In order to stabilize the posture of the electric drive unit 10, other parts of the case 16 are provided with coupling parts such as coupling brackets as needed, and are coupled to the vehicle body such as a frame. The brackets 96L, 96R may be fixed respectively on upper surfaces of the pair of cylindrical portions of the axle housing body 70a, and be coupled to the respective suspension arms 92 above the third axis S3. In the present embodiment, it can be considered that the rotating machine 12, the transaxle 14, and the like are integrally assembled to the axle housing 70 of a rigid axle type.

In such an electric drive unit 10, the rotating machine 12 and the pinion shaft 20 are separately arranged on opposite sides to each other in the vehicle front-rear direction across the third axis S3 that is the axis of the differential device 30 in plan view as seen from above. Hence, the weight balance between the front part and the rear part of the electric drive unit 10 across the third axis S3 that is the axis of the differential device 30 becomes preferable. Thus, it is possible to integrally assemble the rotating machine 12, the parallel shaft transmission 52, the pinion shaft 20, the differential device 30, and the left and right axle shafts 36L, 36R, etc. to the case 16, and thus the electric drive unit 10 can be configured to be compact, which becomes advantageous in space. That is, if the weight balance is poor, it is necessary to increase the strength, rigidity, and the like of each component including the case 16, and compactness of the electric drive unit 10 is inhibited. In addition, as compared to the case in which the pair of rotating machines are coupled in the axial direction and arranged in the vehicle width direction, the dimension in the vehicle width direction can be reduced, and mountability to the vehicle is thus improved along with the compact configuration.

Further, since both the rotating machine 12 and the pinion shaft 20 are arranged in postures parallel to the vehicle front-rear direction, the dimension in the vehicle width direction can be further reduced.

Further, in plan view, the pinion shaft 20 is disposed more vehicle-frontward than the third axis S3 that is the axis of the differential device 30, and a meshing position between the ring gear 32 and the drive pinion 24 is set at a position lower than the third axis S3. However, since this positional relationship is the same as a general vehicle of the related art in which power is transmitted to the differential device via a propeller shaft, the existing differential device 30, drive pinion 24, and axle housing 70, etc. can be used as they are or used without requiring a major design change, so that they can be configured inexpensively.

Also, the parallel shaft transmission 52 is provided in a power transmission path between the rotating machine 12 and the pinion shaft 20, but the parallel shaft transmission 52 is disposed on the same vehicle front side as the pinion shaft 20 in the vehicle front-rear direction with respect to the third axis S3 that is the axis of the differential device 30, and thus the weight on the pinion shaft 20 side becomes heavier. Accordingly, even when the large-sized rotating machine 12 having a relatively heavy weight is used, the weight balance between the front part and the rear part of the electric drive unit across the third axis S3 that is the axis of the differential device 30 can be preferably maintained.

Further, the rotating machine 12 and the pinion shaft 20 are disposed in postures parallel to each other, and the parallel shaft transmission 52 is provided across the output shaft 26 of the rotating machine 12 and the pinion shaft 20; therefore, while the electric drive unit 10 is configured to be compact, torque of the rotating machine 12 is switched in multiple stages by the parallel shaft transmission 52 in accordance with the traveling load, and the required output, etc., and is transmitted to the pinion shaft 20, thus enhancing driving performance and drivability of the vehicle.

In addition, since the axle housing 70, which rotatably holds the left and right axle shafts 36L, 36R and are coupled to the left and right suspension devices 90L, 90R, is integrally configured without using screw fastening, the electric drive unit 10 including this axle housing 70 can be configured with a smaller weight and more inexpensively. That is, for example, as shown in FIG. 5, when a vertical load F1 is applied to the rear wheel 18R on one side due to unevenness of a road surface, the vertical load F1 is transmitted to the axle housing 70 via the wheel mounting member 76R, and a bending stress or the like is generated by reaction forces F2, F3 received from the left and right suspension arms 92. However, if a screw fastening portion is present, this becomes disadvantageous in strength, so that not only additional components such as bolts but also a reinforcing structure etc. are required, which results in increase in weight and a higher cost.

In addition, the rotating machine 12 is integrally fixed to the axle housing 70 in such a manner as to project rearward in the vehicle, the first gear case 72 and the second gear case 74 that house and rotatably support the gear mechanism including the pinion shaft 20 and the parallel shaft transmission 52, etc. are integrally fixed to the axle housing 70, and the electric drive unit 10 is thus integrally configured, so that the electric drive unit 10 can be easily assembled to the vehicle. In other words, the rotating machine 12, the parallel shaft transmission 52, the pinion shaft 20, the differential device 30, and the axle shafts 36L, 36R are assembled to the common case 16, and thus the electric drive unit 10 is integrally configured; therefore, the electric drive unit 10 can be easily assembled to the vehicle.

Further, since the case 16 is coupled to the left and right suspension arms 92 at the lower parts of the case than the third axis S3 that is the axis of the differential device 30, the weight balance between the front part and the rear part of the electric drive unit across the third axis S3 that is the axis of the differential device 30 becomes preferable because of the separate arrangement of the rotating machine 12 and the pinion shaft 20. Hence, the supporting structure, etc. used when the electric drive unit 10 is installed to the vehicle can be simplified, thus attaining weight reduction.

Next, another embodiment of the present disclosure will be described. In the following embodiments, the same reference numerals are added to the parts substantially common to the above-mentioned embodiments, and detailed description thereof will be omitted.

FIGS. 6 to 16 are views explaining another embodiment of the present disclosure, each of which is a skeleton view of the electric drive unit corresponding to FIG. 2, in which the case 16 is omitted. In the electric drive unit 100 of FIG. 6, the power transmission mechanism extending from the rotating machine 12 to the pinion shaft 20 is arranged inversely in the vehicle front-rear direction, as compared to the electric drive unit 10. That is, the rotating machine 12 is disposed more vehicle-frontward than the third axis S3 that is an axis of the differential device 30 in plan view, and the gear mechanism including the pinion shaft 20 and the parallel shaft transmission 52 is arranged more vehicle-rearward than the third axis S3. Further, the meshing position between the ring gear 32 of the differential device 30 and the drive pinion 24 is set at a position above the third axis S3 that is the axis of the differential device 30. In other words, the positional relationship between the ring gear 32 and the drive pinion 24 is the same as that in the case in which they are rotated at 180 degrees about the third axis S3 in the above embodiment. Therefore, it is possible to use the existing differential device 30 and drive pinion 24 as they are or use them without requiring a major design change; therefore, it is possible to obtain substantially the same effect as that of the above-described embodiment, such as configuring the electric drive unit more inexpensively.

Figure 6:
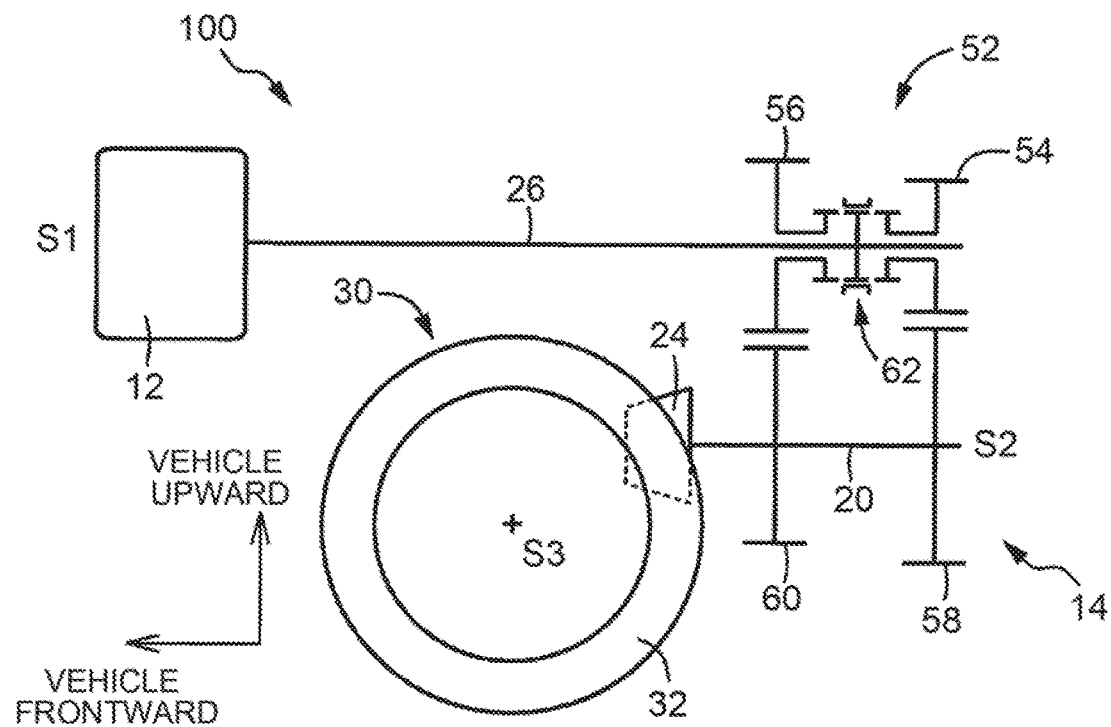
FIG. 6 is a view explaining another embodiment of the present disclosure, and is a skeleton view corresponding to FIG. 2, in which a case is omitted.
Figure 7:
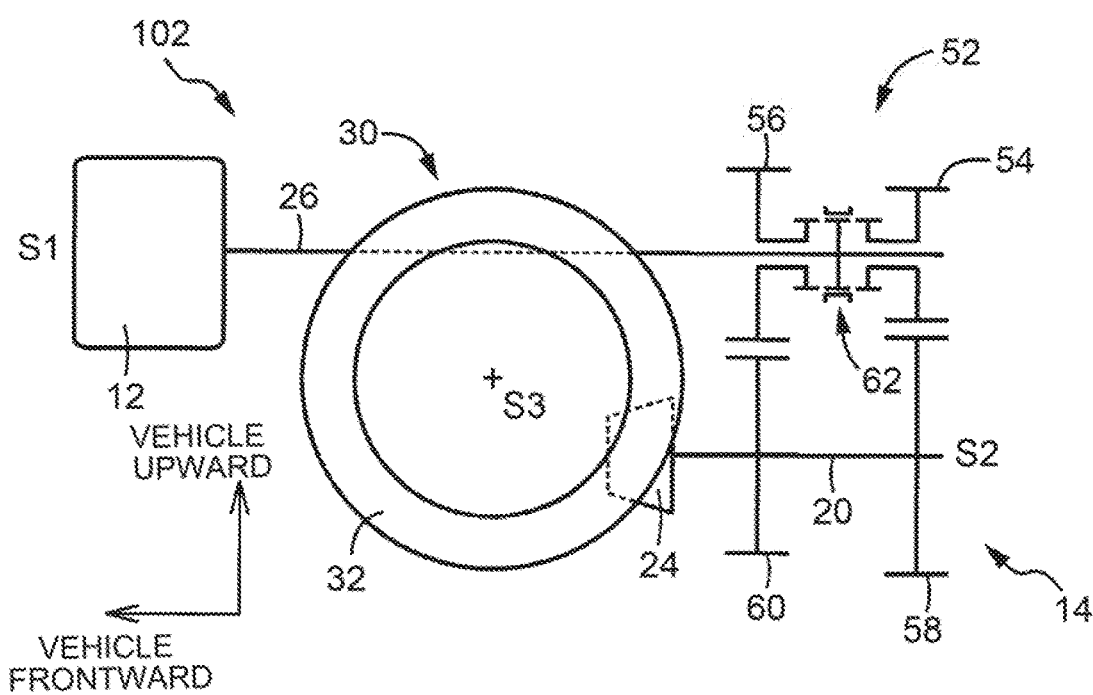
FIG. 7 is a view explaining yet another embodiment of the present disclosure, and is a skeleton view corresponding to FIG. 2, in which the case is omitted.

As compared to the electric drive unit 100 of FIG. 6, an electric drive unit 102 of FIG. 7 is configured such that the power transmission mechanism extending from the rotating machine 12 to the pinion shaft 20 is relatively shifted vehicle-downward relative to the differential device 30 in such a manner that the meshing position between the ring gear 32 of the differential device 30 and the drive pinion 24 is located at a position below the third axis S3 that is the axis of the differential device 30.

Figure 8:
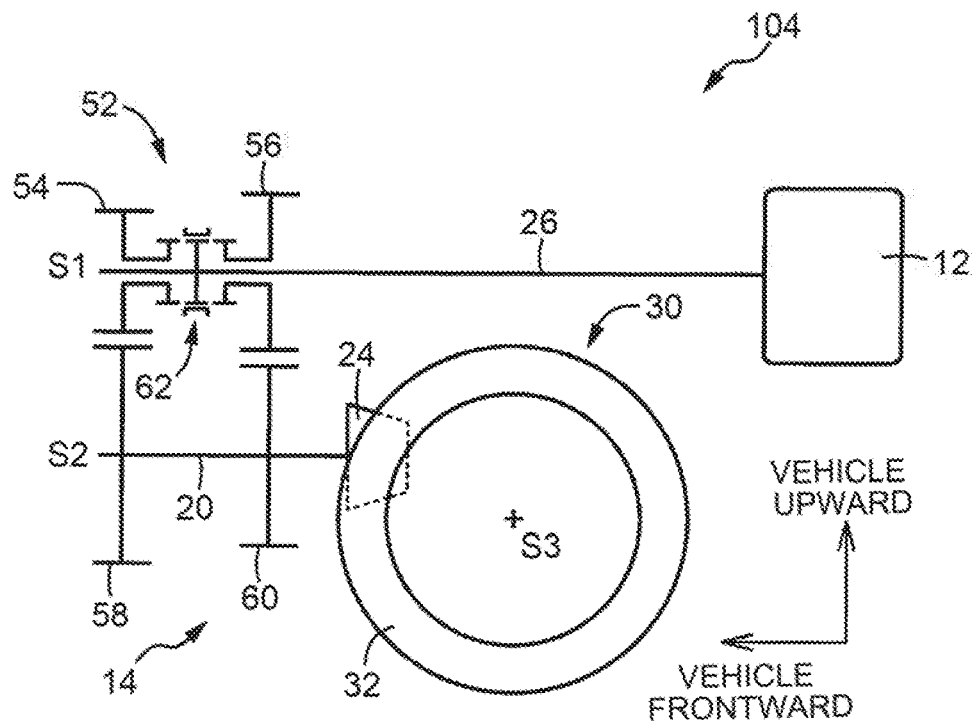
FIG. 8 is a view explaining yet another embodiment of the present disclosure, and is a skeleton view corresponding to FIG. 2, in which the case is omitted.

As compared to the electric drive unit 10, an electric drive unit 104 of FIG. 8 is configured such that the power transmission mechanism extending from the rotating machine 12 to the pinion shaft 20 is relatively shifted vehicle-upward relative to the differential device 30 in such a manner that the meshing position between the ring gear 32 of the differential device 30 and the drive pinion 24 is located at a position above the third axis S3 that is the axis of the differential device 30.

In each of the electric drive units 10, 100, 102, and 104, the meshing position between the ring gear 32 and the drive pinion 24 is located at a position above or below the third axis S3 that is the axis of the differential device 30, but it is also possible to set the meshing position between the ring gear 32 and the drive pinion 24 at substantially the same height position as that of the third axis S3.

Figure 9:
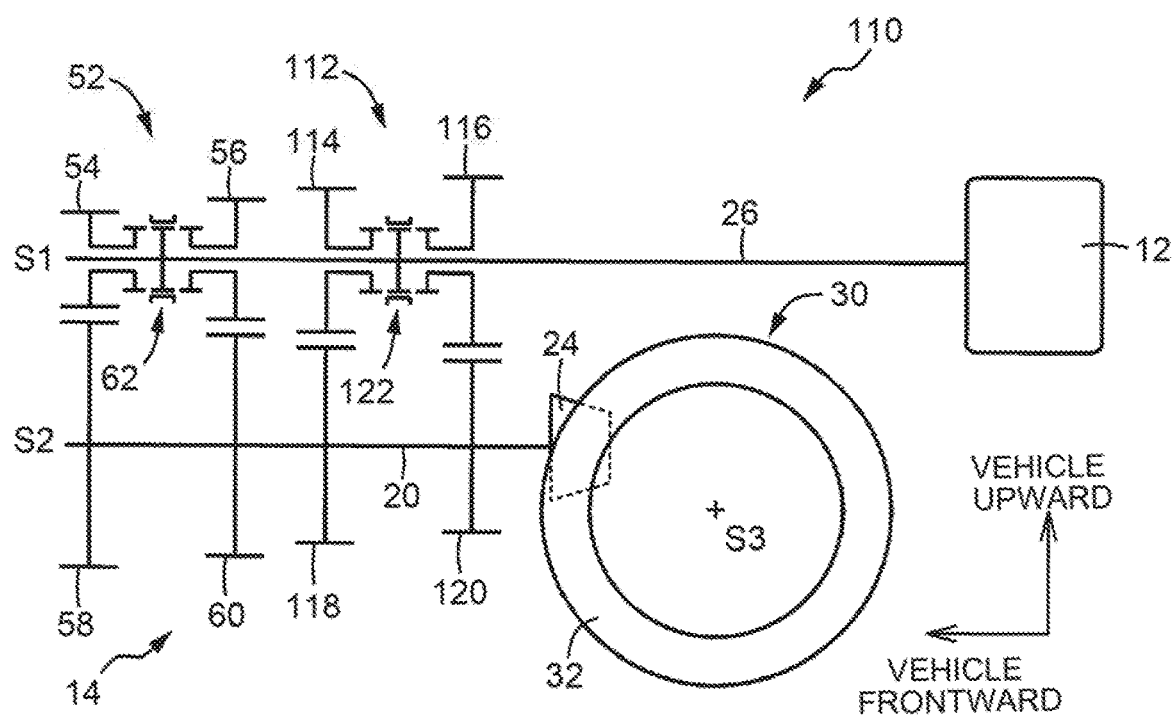
FIG. 9 is a view explaining yet another embodiment of the present disclosure, and is a skeleton view corresponding to FIG. 2, in which the case is omitted.

As compared to the electric drive unit 104 of FIG. 8, an electric drive unit 110 of FIG. 9 is configured such that a second parallel shaft transmission 112 is provided in addition to the parallel shaft transmission 52 in parallel between the output shaft 26 and the pinion shaft 20. The second parallel shaft transmission 112 includes: a pair of transmission drive gears 114, 116 disposed to be relatively rotatable around the output shaft to be rotatable about the first axis S1; a pair of transmission driven gears 118, 120 provided to the pinion shaft 20 so as to mesh with the transmission drive gears 114, 116; and a meshing clutch mechanism 122 with a synchro mechanism that selectively couples the pair of transmission drive gears 114, 116 to the output shaft 26. Then, the transmission drive gear 54 of the parallel shaft transmission 52 is coupled to the output shaft 26, to thereby establish a first gear stage having the largest gear ratio; the transmission drive gear 56 is coupled to the output shaft 26, to thereby establish a second gear stage having the second largest gear ratio; a transmission drive gear 114 of the second parallel shaft transmission 112 is coupled to the output shaft 26, to thereby establish a third gear stage having the third largest gear ratio; a transmission drive gear 116 is coupled to the output shaft 26, to thereby establish a fourth gear stage having the smallest gear ratio; and none of the transmission drive gears 54, 56, 114, 116 is coupled to the output shaft 26, to thereby establish a neutral to separate the rotating machine 12 from the power transmission path. Instead of the meshing clutch mechanism 122, a single-disk type or multi-disk type friction engagement clutch may be used.

In the present embodiment, the rotating machine 12 and the pinion shaft 20 are disposed in parallel with each other, and two sets of parallel shaft transmissions 52, 112 are provided across the output shaft 26 of the rotating machine 12 and the pinion shaft 20, and thus four-stage speed shift can be carried out. Therefore, while the dimensions in the vehicle width direction and the height direction of the electric drive unit 110 are configured to be compact, the parallel shaft transmissions 52, 112 switch the torque of the rotating machine 12 in four stages in accordance with the traveling load, and the required output, etc., and transmit the torque to the pinion shaft 20, to thereby promote enhancement of driving performance and drivability of the vehicle.

Further, the two sets of parallel shaft transmissions 52, 112 are disposed on the vehicle front side, which is the same side as the pinion shaft 20, in the vehicle front-rear direction across the third axis S3 that is the axis of the differential device 30; thus, also in the case of adopting a large-sized one with a relatively heavy weight as the rotating machine 12 provided on the vehicle rear side, the weight balance between the front part and the rear part of the electric drive unit across the third axis S3 can be favorably maintained.

Figure 10:
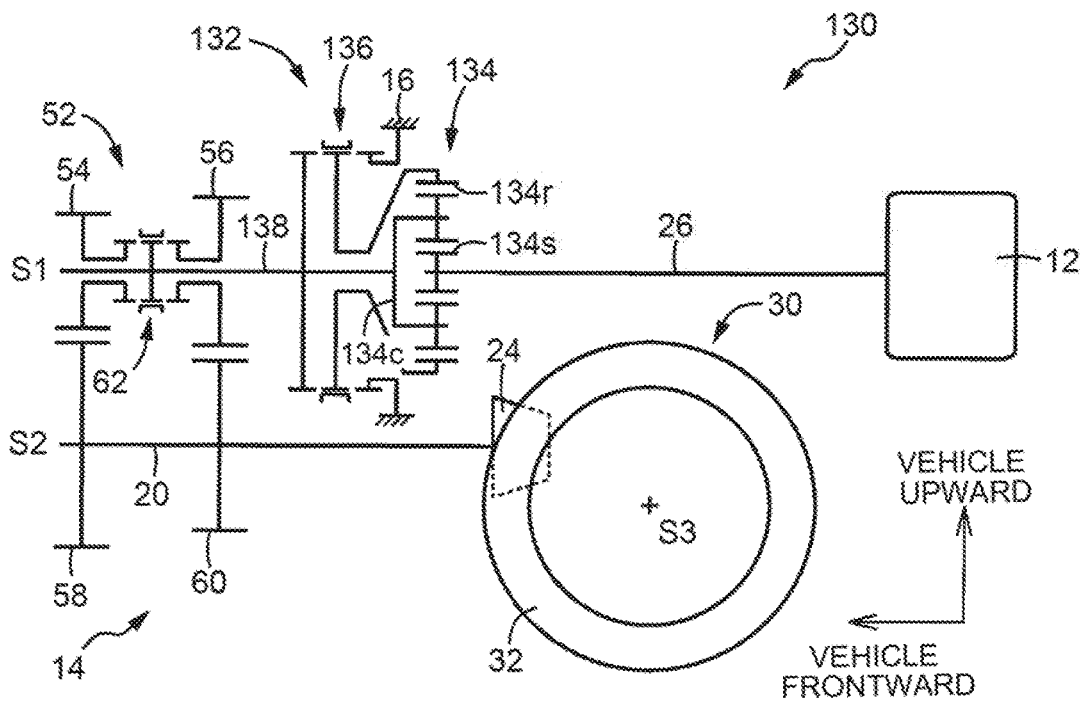
FIG. 10 is a view explaining yet another embodiment of the present disclosure, and is a skeleton view corresponding to FIG. 2, in which the case is omitted.

As compared to the electric drive unit 110 of FIG. 9, an electric drive unit 130 of FIG. 10 is provided with a planetary gear transmission 132 in which a two-stage speed shift is feasible in place of the second parallel shaft transmission 112. The planetary gear transmission 132 is coaxially disposed on the first axis S1, and is disposed more vehicle frontward than the third axis S3 in plan view. The planetary gear transmission 132 is configured to include a planetary gear device 134 of a single pinion type and a meshing clutch mechanism 136 with a synchro mechanism, and the input shaft 26 is coupled to a sun gear 134s of the planetary gear device 134, and a transmission shaft 138 is coupled to a carrier 134c. The transmission shaft 138 is coaxially arranged on the first axis S1. The meshing clutch mechanism 136 is configured to selectively couple a ring gear 134r of the planetary gear device 134 to the case 16 or the transmission shaft 138, and the ring gear 134r is coupled and fixed to the case 16, whereby a low speed gear stage having a large gear ratio is established; and the ring gear 134r is coupled to the transmission shaft 138, whereby a high speed gear stage having a small gear ratio is established. The gear ratio of the high speed gear stage is "1".

Further, as the ring gear 134r is coupled to neither the case 16 nor the transmission shaft 138, established is a neutral that allows the ring gear 134r to freely rotate and separates the rotating machine 12 from the power transmission path. This planetary gear transmission 132 is coupled in series to the parallel shaft transmission 52 provided across the transmission shaft 138 and the pinion shaft 20, and a four-stage speed shift is feasible in combination with this parallel shaft transmission 52.

In place of the meshing clutch mechanism 136, a single-disk type or multi-disk type friction engagement clutch or brake may be used. In addition, the planetary gear transmission 132 in various modes may be adopted, for example, using a double pinion type planetary gear device, using a plurality of planetary gear devices, or the like. Further, the parallel shaft transmission 52 may be omitted, and the transmission shaft 138 and the pinion shaft 20 may be coupled to each other by a set of gear pairs, to thereby provide a two-stage gear shift by the planetary gear transmission 132.

Figure 11:
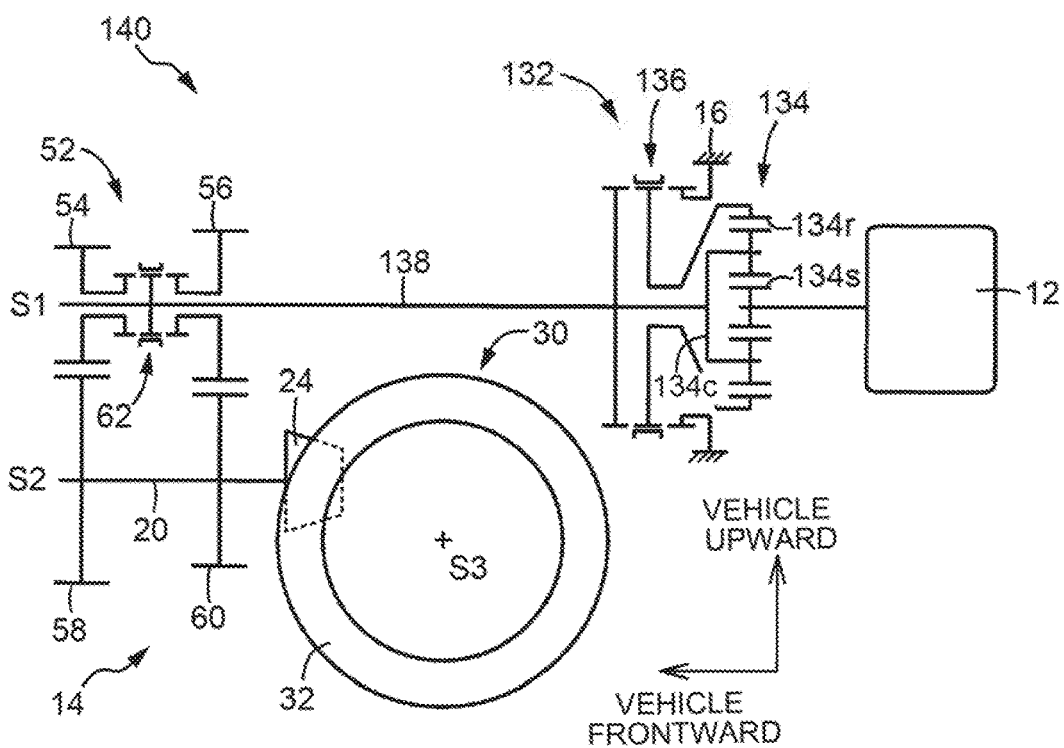
FIG. 11 is a view explaining yet another embodiment of the present disclosure, and is a skeleton view corresponding to FIG. 2, in which the case is omitted.

As compared to the electric drive unit 130 of FIG. 10, an electric drive unit 140 of FIG. 11 is configured such that the planetary gear transmission 132 is disposed more vehicle-rearward than the third axis S3, that is, on the rotating machine 12 side in plan view; and the transmission shaft 138 is disposed to intersect the third axis S3 at a right angle in plan view and extend in the vehicle front-rear direction. In the present embodiment, when a small-sized rotating machine with a relatively small weight is used as the rotating machine 12, the weight balance between the front part and the rear part of the electric drive unit across the third axis S3 can be preferably maintained.

Also in each of the electric drive units 110, 130, 140 shown in FIGS. 9 to 11, the power transmission mechanism extending from the rotating machine 12 to the pinion shaft 20 can be shifted toward the vehicle lower side relative to the differential device 30 in such a manner that the meshing position between the ring gear 32 of the differential device 30 and the drive pinion 24 is located below the third axis S3 that is the axis of the differential device 30 or approximately at the same height as the third axis S3. Further, the power transmission mechanism extending from the rotating machine 12 to the pinion shaft 20 may be arranged inversely in the vehicle front-rear direction, that is, the rotating machine 12 and the like may be disposed more vehicle-frontward than the third axis S3 that is the axis of the differential device 30, and the pinion shaft 20 or the like may be disposed more vehicle-rearward than the third axis S3 in plan view.

Figure 12:
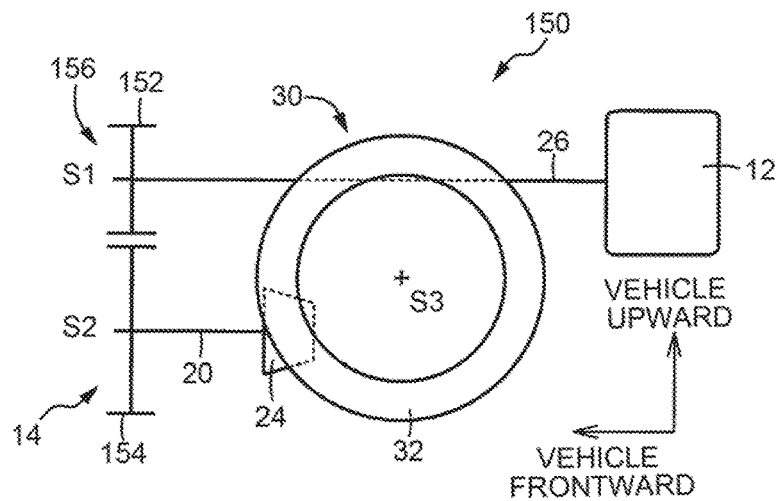
FIG. 12 is a view explaining yet another embodiment of the present disclosure, and is a skeleton view corresponding to FIG. 2, in which the case is omitted.

An electric drive unit 150 of FIG. 12 is not provided with the multistage parallel shaft transmission 52, which is different from the electric drive unit 10, the output shaft 26 is provided with a small diameter gear 152, and the pinion shaft 20 is provided with a large diameter gear 154 meshing with the small diameter gear 152, and the small diameter gear 152 and the large diameter gear 154 configure a parallel shaft reduction mechanism 156. This parallel shaft reduction mechanism 156 corresponds to a transmission mechanism, and the large diameter gear 154 corresponds to a driven gear.

Figure 13:
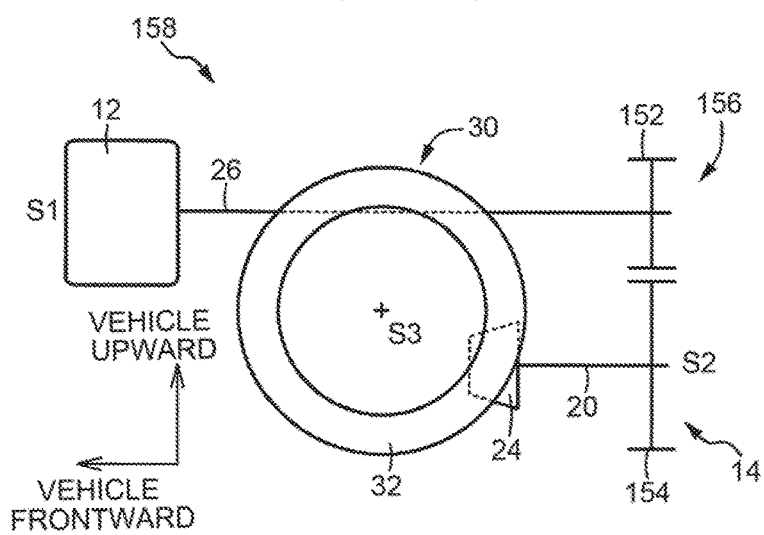
FIG. 13 is a view explaining yet another embodiment of the present disclosure, and is a skeleton view corresponding to FIG. 2, in which the case is omitted.

As compared to the electric drive unit 150 of FIG. 12, the electric drive unit 158 of FIG. 13 is configured such that the power transmission mechanism extending from the rotating machine 12 to the pinion shaft 20 is disposed inversely in the vehicle front-rear direction, that is, the rotating machine 12 is disposed more vehicle-frontward than the third axis S3 that is the axis of the differential device 30, and the pinion shaft 20 or the like is disposed more vehicle-rearward than the third axis S3 in plan view. Also in these electric drive units 150, 158, the power transmission mechanism extending from the rotating machine 12 to the pinion shaft 20 can be shifted toward the vehicle upper side relative to the differential device 30 in such a manner that the meshing position between the ring gear 32 and the drive pinion 24 is located above the third axis S3 that is the axis of the differential device 30 or approximately at the same height as the third axis S3.

Figure 14:
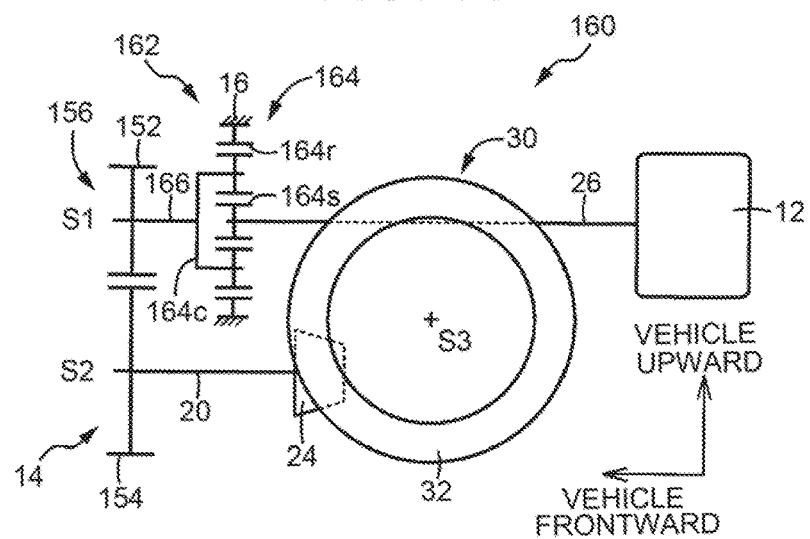
FIG. 14 is a view explaining yet another embodiment of the present disclosure, and is a skeleton view corresponding to FIG. 2, in which the case is omitted.

The electric drive unit 160 of FIG. 14 is provided with a planetary gear reduction mechanism 162 as a transmission mechanism disposed on the first axis S1 and more vehicle-frontward than the third axis S3 in plan view, which is different from the electric drive unit 150 of FIG. 12. The planetary gear reduction mechanism 162 mainly includes a single pinion type planetary gear device 164, the input shaft 26 is coupled to a sun gear 164s of the planetary gear device 164, a transmission shaft 166 is coupled to a carrier 164c, and a ring gear 164r is fixed to the case 16. According to such a planetary gear reduction mechanism 162, the rotation of the input shaft 26 is decelerated in accordance with the gear ratio of the planetary gear device 164 and transmitted to the transmission shaft 166, and the speed is further reduced by the parallel shaft reduction mechanism 156 provided between the transmission shaft 166 and the pinion shaft 20, and is then transmitted to the pinion shaft 20. The planetary gear reduction mechanism 162 can also be configured using a double pinion type planetary gear device instead of the single pinion type planetary gear device 164. The transmission shaft 166 is coaxially provided on the first axis S1.

In the present embodiment, since the planetary gear reduction mechanism 162 and the parallel shaft reduction mechanism 156 are coupled to each other in series and the rotation of the output shaft 26 is reduced in two stages and transmitted to the pinion shaft 20, the torque of the rotating machine 12 is amplified accordingly, driving performance and drivability of the vehicle are enhanced, or a small-sized rotating machine 12 can be adopted. In addition, since the planetary gear reduction mechanism 162 and the parallel shaft reduction mechanism 156 are disposed on the vehicle-front side on which the pinion shaft 20 is also located in the vehicle front-rear direction across the third axis S3 that is the axis of the differential device 30, even in the case of adopting a large-sized one having a relatively heavy weight as the rotating machine 12 located on the vehicle-rear side, the weight balance between the front part and the rear part of the electric drive unit across the third axis S3 can be favorably maintained.

Figure 15:
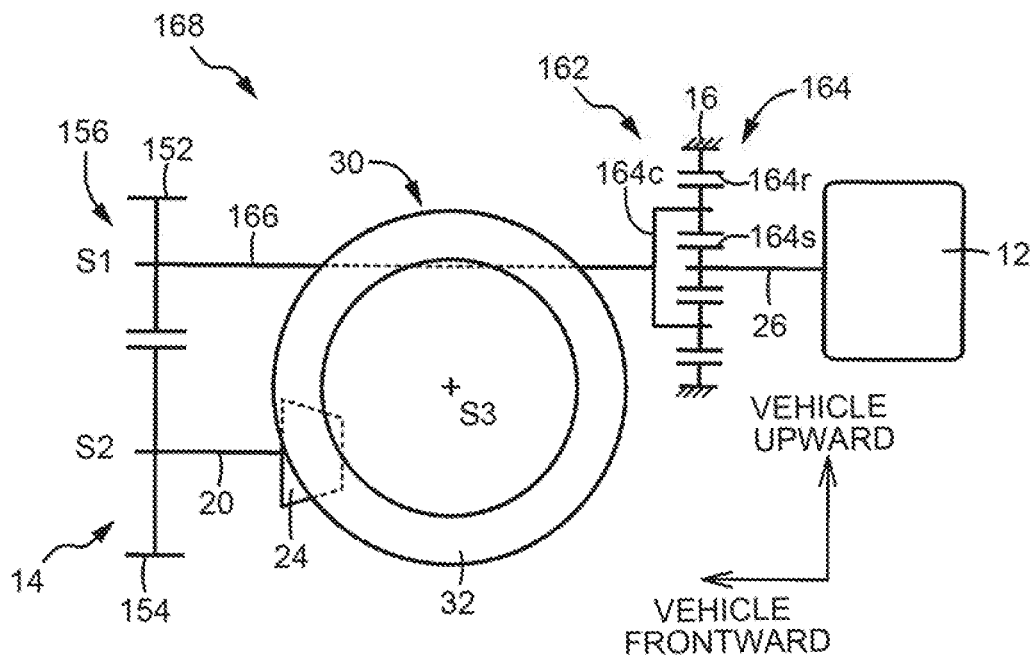
FIG. 15 is a view explaining yet another embodiment of the present disclosure, and is a skeleton view corresponding to FIG. 2, in which the case is omitted.

As compared to the electric drive unit 160 of FIG. 14, an electric drive unit 168 of FIG. 15 is configured such that the planetary gear reduction mechanism 162 is disposed more vehicle-rearward than the third axis S3, that is, on the rotating machine 12 side in plan view, and the transmission shaft 166 is disposed to intersect the third axis S3 at a right angle and extend in the vehicle front-rear direction in plan view. In the present embodiment, when a small-sized rotating machine having a relatively small weight is used as the rotating machine 12, the weight balance between the front part and the rear part of the electric drive unit across the third axis S3 can be preferably maintained.

Figure 16:
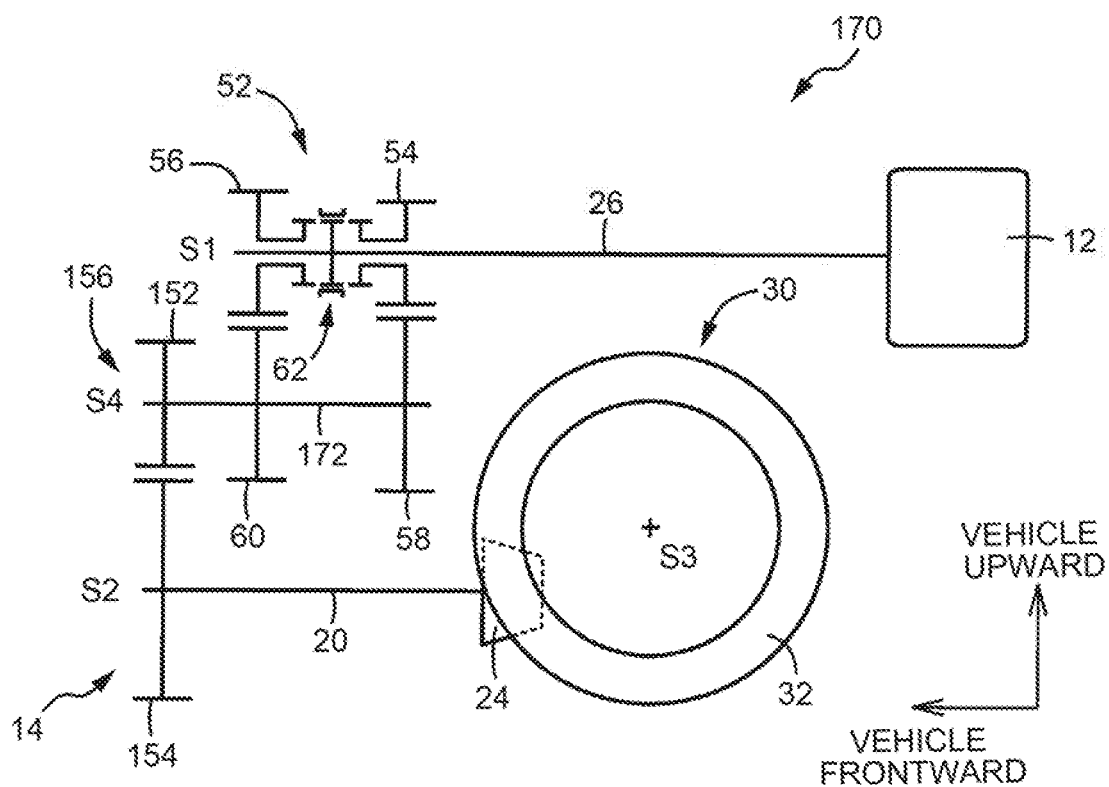
FIG. 16 is a view explaining yet another embodiment of the present disclosure, and is a skeleton view corresponding to FIG. 2, in which the case is omitted.

In the electric drive unit 170 of FIG. 16, which is different from the electric drive unit 10, a fourth axis S4 is set between and parallel to the first axis S1 and the second axis S2, that is, parallel to the vehicle front-rear direction, and an intermediate shaft 172 is provided on this fourth axis S4. The fourth axis S4 coincides with the axis of the intermediate shaft 172. The intermediate shaft 172 is provided with a pair of transmission driven gears 58, 60 of the parallel shaft transmission 52 and also with the small diameter gear 152 of the parallel shaft reduction mechanism 156, and is coupled to the pinion shaft 20 via the parallel shaft reduction mechanism 156. In this case, the gear ratio (reduction ratio) of the entire power transmission mechanism can be made larger than that of the electric drive unit 10. The first axis S1, the second axis S2, and the fourth axis S4 can be set to be shifted in the vehicle width direction (front-back direction of the paper surface in FIG. 6).

Also in the electric drive units 160, 168 and 170 shown in FIGS. 14 to 16, the power transmission mechanism extending from the rotating machine 12 to the pinion shaft 20 can be shifted toward the vehicle upper side relative to the differential device 30 in such a manner that the meshing position between the ring gear 32 and the drive pinion 24 is located above the third axis S3 that is the axis of the differential device 30 or approximately at the same height as the third axis S3. In addition, the power transmission mechanism extending from the rotating machine 12 to the pinion shaft 20 may be disposed inversely in the vehicle front-rear direction, that is, the rotating machine 12 or the like may be disposed more vehicle-frontward than the third axis S3 that is the axis of the differential device 30, and the pinion shaft 20 or the like may be disposed more vehicle-rearward than the third axis S3 in plan view.

Figure 17:
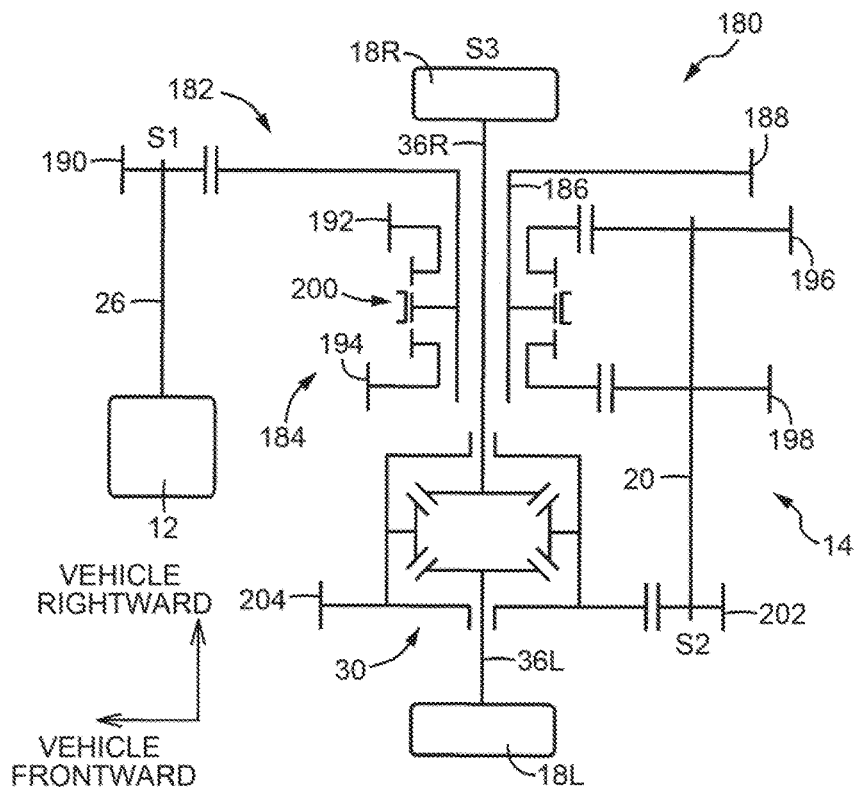
FIG. 17 is a view explaining yet another embodiment of the present disclosure, and is a skeleton view corresponding to FIG. 1, in which the case is omitted.

FIG. 17 is a skeleton view of an electric drive unit corresponding to FIG. 1 in which the case 16 is omitted. This electric drive unit 180 is configured such that the first axis S1 that is the axis of the rotating machine 12 is set to be parallel to the third axis S3 that is the axis of the differential device 30, which means, the first axis S1 is parallel to the vehicle width direction, and is set more vehicle-frontward than the third axis S3 in plan view. Further, the second axis S2 that is an axis of the pinion shaft 20 is parallel to the third axis S3, that is, parallel to the vehicle width direction, and is set more vehicle-rearward than the third axis S3 in plan view, and the rotation of the rotating machine 12 is transmitted to the pinion shaft 20 via the parallel shaft reduction mechanism 182 and the parallel shaft transmission 184. The parallel shaft reduction mechanism 182 includes a hollow intermediate shaft 186 rotatably provided about the third axis S3 to be relatively rotatable with respect to the axle shaft 36R, the intermediate shaft 186 is provided with a large diameter gear 188 for speed reduction, and meshes with a small diameter gear 190 provided on the output shaft 26. The parallel shaft transmission 184 is disposed between the intermediate shaft 186 and the output shaft 26, and includes: a pair of transmission drive gears 192, 194 rotatably provided about the third axis S3 so as to be rotatable relative to the intermediate shaft 186; a pair of transmission driven gears 196, 198 provided on the pinion shaft 20 to mesh with the transmission drive gears 192, 194; and a meshing clutch mechanism 200 with a synchro mechanism that selectively couples the pair of transmission drive gears 192, 194 to the intermediate shaft 186. The transmission drive gear 192 is coupled to the intermediate shaft 186, whereby a low speed gear stage having a large gear ratio is established; the transmission drive gear 194 is coupled to the intermediate shaft 186, whereby a high speed gear stage having a small gear ratio is established; and neither the transmission drive gears 192 nor 194 is coupled to the intermediate shaft 186, whereby a neutral to separate the rotating machine 12 from the power transmission path can be established. Further, the pinion shaft 20 is provided with a drive pinion 202 so as to mesh with a ring gear 204 of the differential device 30. These drive pinion 202 and ring gear 204 are parallel shaft gears such as helical gears.

Also in the present embodiment, since the rotating machine 12 and the pinion shaft 20 are separately arranged on the opposite sides to each other in the vehicle front-rear direction across the third axis S3 that is the axis of the differential device 30 in plan view as seen from above the vehicle, the same operational effect as that of the above-described embodiment can be obtained, such as enhancement of the weight balance between the front part and the rear part of the electric drive unit 180 across the third axis S3 that is the axis of the differential device 30.

In the above embodiment, the first axis S1 that is the axis of the rotating machine 12 and the second axis S2 that is the axis of the pinion shaft 20 can be set at any positions about the third axis S3, and these axes can be appropriately changed in a condition that they are located on the opposite sides to each other in the vehicle front-rear direction across the third axis S3 in plan view. Also, in place of the above-mentioned meshing clutch mechanism 200, a single-disk type or multi-disk type friction engagement clutch can be used.

Figure 18:
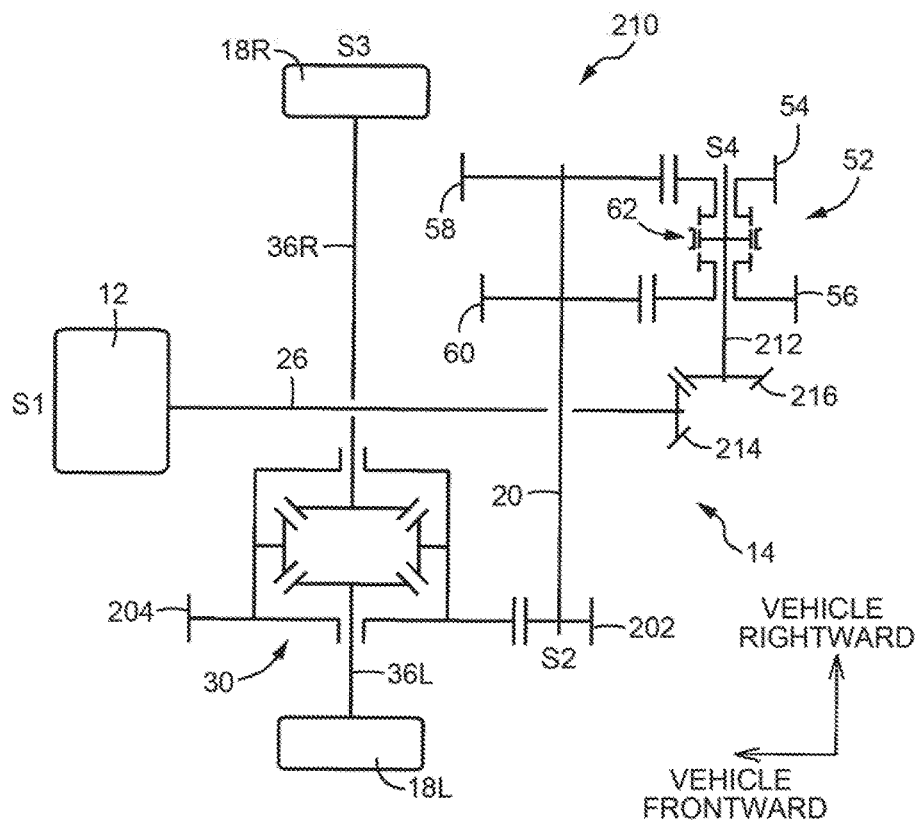
FIG. 18 is a view explaining yet another embodiment of the present disclosure, and is a skeleton view corresponding to FIG. 1, in which the case is omitted.
Figure 19:
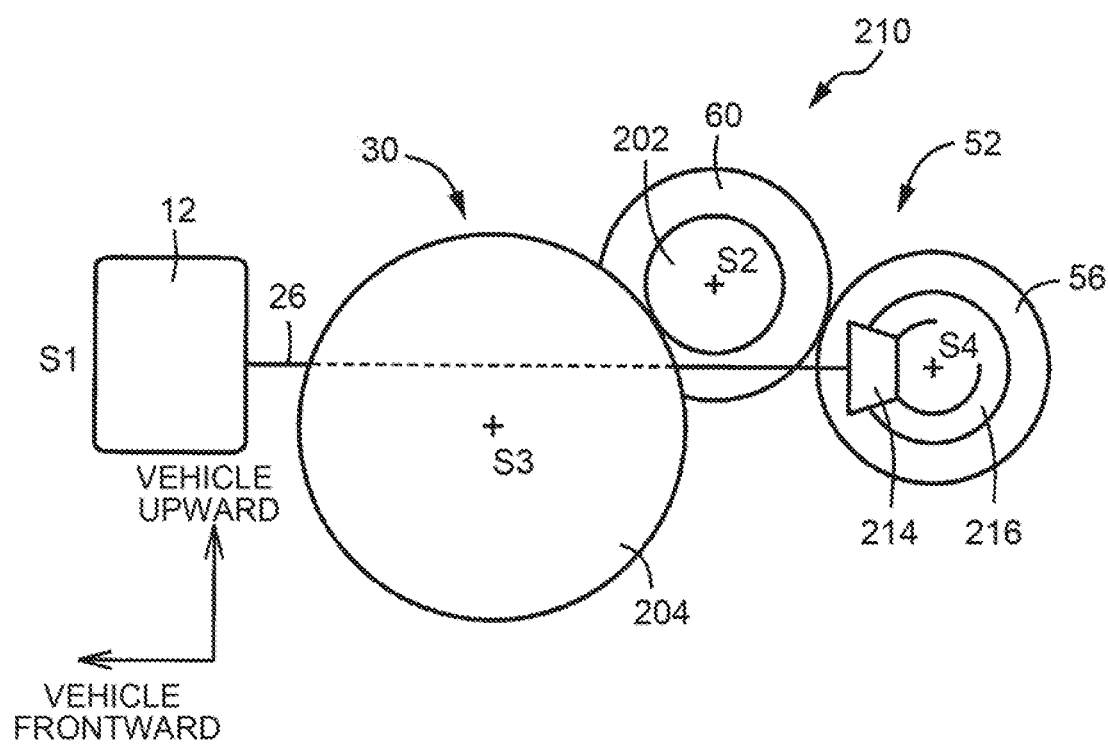
FIG. 19 is a left side view of an embodiment of FIG. 18, and is a skeleton view in which a left rear wheel is omitted.

FIG. 18 is a skeleton view of the electric drive unit corresponding to FIG. 1 in which the case 16 is omitted. FIG. 19 is a left side view of the embodiment in FIG. 18 in which the left rear wheel 18L is omitted. The electric drive unit 210 is different from the electric drive unit 180 in FIG. 17 in that the first axis S1 that is the axis of the rotating machine 12 is parallel to the vehicle front-rear direction in plan view, and the rotating machine 12 is disposed more vehicle-frontward than the third axis S3 that is the axis of the differential device 30, and at the same time, an intermediate shaft 212 is coaxially provided on a fourth axis S4 parallel to the second axis S2 that is the axis of the pinion shaft 20 located more vehicle-rearward than the third axis S3. The output shaft 26 of the rotating machine 12 is disposed at a position above the axle shaft 36R and extends in the vehicle front-rear direction so as to intersect the third axis S3 at a right angle in plan view; and the end on the vehicle rear side of the output shaft 26 is coupled to the intermediate shaft 212 via a pair of bevel gears 214, 216 meshing with each other. The pair of bevel gears 214, 216 have different numbers of teeth and also function as a reduction mechanism. The parallel shaft transmission 52 is disposed across the intermediate shaft 212 and the pinion shaft 20.

Also in the present embodiment, since the rotating machine 12 and the pinion shaft 20 are separately disposed on the opposite sides to each other in the vehicle front-rear direction across the third axis S3 that is the axis of the differential device 30 in plan view as seen from above the vehicle, the same operational effect as that of the above-described embodiment can be obtained, such as enhancement of the weight balance between the front part and the rear part of the electric drive unit 210 across the third axis S3 that is the axis of the differential device 30.

In the above embodiment, although the output shaft 26 and the intermediate shaft 212 are arranged in a positional relationship perpendicular to each other, and are coupled to each other via the bevel gears 214, 216, it is also possible to arrange the output shaft 26 and the intermediate shaft 212 in a twisted positional relationship and couple the output shaft 26 and the intermediate shaft 212 to each other using a hypoid gear. In addition, it is possible to eliminate the intermediate shaft 212, and directly couple the output shaft 26 and the pinion shaft 20 to each other via a bevel gear or a hypoid gear. Further, in any of the above embodiments, the left and right configurations of the vehicle including the electric drive unit 210 can be exchanged from each other.

As mentioned above, although the embodiments of the present disclosure have been described in detail based on the drawings, they are merely examples of the embodiments, and the present disclosure can be implemented in variously modified and improved forms based on the knowledge of those skilled in the art.

What is claimed is:

1. A vehicle electric drive system comprising:
a rotating machine that is a driving power source causing movement of a vehicle;
a differential device that distributes power transmitted from the rotating machine to left and right drive wheels of the vehicle;
a pinion shaft including a driven gear to which the power output from the rotating machine is transmitted, and a drive pinion that meshes with a ring gear of the differential device, the rotating machine and the pinion shaft being separately arranged on opposite sides of an axis of the differential device relative to each other in a vehicle front-rear direction across an axis of the differential device, the axis of the differential device being parallel to a vehicle width direction, when viewed in a plan view as seen from above the vehicle, the pinion shaft being disposed more vehicle-frontward than the axis of the differential device in the plan view, and a meshing position between the ring gear and the drive pinion is set at a position lower than the axis of the differential device in a vehicle height direction.

2. The vehicle electric drive system according to claim 1, wherein:
the rotating machine is disposed in a posture in which an axis of the rotating machine is parallel to the vehicle front-rear direction in the plan view, and
an output shaft of the rotating machine, in a posture in which the output shaft intersects the axis of the differential device at a right angle in the plan view, is disposed at a position above the axis of the differential device in the vehicle height direction.

3. The vehicle electric drive system according to claim 2, wherein:
the pinion shaft is disposed in a posture in which an axis of the pinion shaft is parallel to the vehicle front-rear direction in the plan view,
the differential device includes a differential gear device of a bevel gear type, and
the ring gear and the drive pinion include hypoid gears.

4. The vehicle electric drive system according to claim 1, wherein:
a transmission mechanism is provided in a power transmission path between the rotating machine and the pinion shaft, and
at least a part of the transmission mechanism is disposed on a same side as the pinion shaft in the vehicle front-rear direction relative to the axis of the differential device in the plan view.

5. The vehicle electric drive system according to claim 1, wherein:
the rotating machine and the pinion shaft are arranged such that respective axes of the rotating machine and the pinion shaft are parallel to each other, and
a parallel shaft transmission that establishes multiple gear stages with different gear ratios is provided across the output shaft of the rotating machine and the pinion shaft.

6. The vehicle electric drive system according to claim 1, further comprising an axle housing that rotatably holds left and right axle shafts to which the power distributed by the differential device is transmitted, the axle housing being coupled to left and right suspension devices, and the axle housing is integrally configured using no screw fastening.

7. The vehicle electric drive system according to claim 6, wherein:
- the rotating machine and the pinion shaft are disposed in postures in which the respective axes of the rotating machine and the pinion shaft are parallel to the vehicle front-rear direction in the plan view,
- the rotating machine is integrally fixed to the axle housing in such a manner that the rotating machine protrudes to one side in the vehicle front-rear direction,
- a gear case is integrally fixed to the axle housing in such a manner that the gear case protrudes to the other side in the vehicle front-rear direction, the gear case being configured to house and rotatably support a gear mechanism including the pinion shaft, and
- the vehicle electric drive system is integrally configured.

8. The vehicle electric drive system according to claim 1, wherein:
- the rotating machine, the pinion shaft, and the differential device are assembled in a common case,
- the vehicle electric drive system is integrally configured, and
- the common case is coupled to a member on a vehicle body side at an upper part or a lower part of the common case relative to the axis of the differential device.

* * * * *